United States Patent [19]

Sekmakas et al.

[11] 4,265,795

[45] May 5, 1981

[54] CATIONIC AMINE-FUNCTIONAL COPOLYMER MIXTURE WITH AMINOPLAST RESIN AND AQUEOUS BATHS CONTAINING THE SAME

[75] Inventors: Kazys Sekmakas, Palatine; Raj Shah, Schaumburg, both of Ill.

[73] Assignee: DeSoto, Inc., Des Plaines, Ill.

[21] Appl. No.: 85,199

[22] Filed: Oct. 16, 1979

Related U.S. Application Data

[63] Continuation-in-part of Ser. No. 20,688, Mar. 15, 1979, Pat. No. 4,198,495.

[51] Int. Cl.$^3$ .................. C08L 61/12; C08L 61/26
[52] U.S. Cl. .............................. 260/29.3; 204/181 C; 260/29.4 UA; 260/29.6 NR; 260/33.2 R; 525/142; 525/162
[58] Field of Search ...... 260/29.4 UA, 29.3, 29.6 TA, 260/29.6 NR, 33.2 R; 204/181 C; 525/142, 162

[56] References Cited

U.S. PATENT DOCUMENTS 4,012,353   3/1977   Chasin et al. .............. 260/29.6 NR

*Primary Examiner*—Theodore E. Pertilla
*Attorney, Agent, or Firm*—Dressler, Goldsmith, Shore, Sutker & Milnamow, Ltd.

[57] ABSTRACT

Cationic amine-functional copolymer mixtures with aminoplast resins which are stably dispersible in water with the aid of a solubilizing acid and water miscible organic solvent, and which cure to possess superior detergent and corrosion resistance are provided by forming a solution copolymer of monoethylenically unsaturated monomers including from 3% to 35% of monomer having a basic amino group and from 20% to less than 35% of isobutoxymethyl acrylamide or methacrylamide. The copolymer preferably includes from 20% to 45% of styrene and/or vinyl toulene in admixture with from 15% to 40% of 2-ethylhexyl methacrylate and the preferred aminoplast resins are benzoguanamine-formaldehyde and bisphenol-formaldehyde.

12 Claims, No Drawings ns. Pat. No. 4,265,795

CATIONIC AMINE-FUNCTIONAL COPOLYMER MIXTURE WITH AMINOPLAST RESIN AND AQUEOUS BATHS CONTAINING THE SAME

This application is a continuation-in-part of our copending application Ser. No. 20,688, filed Mar. 15, 1979, now U.S. Pat. No. 4,198,495 issued 4/15/80.

DESCRIPTION

1. Technical Field

This invention relates to amine-functional cationic copolymer mixtures with aminoplast resin which are particularly adapted for cationic electrocoating from an aqueous bath.

2. Background Art

Amine-functional copolymers are well known, and these have been rendered cationic and water dispersible by neutralization with a solubilizing acid. The dispersed resin particles migrate to the cathode when a unidirectional electrical current is passed through the aqueous medium which contains the resin particles, and these particles deposit upon the cathode to form a coating thereon. The coated cathode is removed from the electrocoating bath and then baked to cure the coating.

In the usual practice, the amine-functional copolymer contains reactive groups, such as hydroxy groups, and an aminoplast resin curing agent is incorporated in the bath for codeposit with the reactive amine copolymer, and the aminoplast resin cross-links the copolymer when the coating is baked. Melamine-formaldehyde condensates have been used, but the corrosion resistance and detergent resistance have not been fully satisfactory. Benzoguanamine-formaldehyde condensates provide better properties in the cured films, but these are much more expensive, and this disadvantage grows greater as the proportion of use increases.

It has also been disclosed to incorporate N-methylol-functional reactive groups in the amine copolymer so as to provide a self-curing cationic copolymer which would enable the use of a curing coreactant, such as the aminoplast resins normally used, to be eliminated. However, and despite the obvious simplification and economy provided through the use of self-curing resins, these self-curring cationic systems have not been successful in industry, probably because it has been difficult to combine the curing reactivity and bath stability which is needed to enable a system to be successful.

The prior efforts using self-curing copolymers are summarized in U.S. Pat. Nos. 3,446,723, 3,454,482, 3,455,806 and 3,458,420. The thrust of these patents is to use not more than 30%, based on the weight of the copolymer, of the N-methylol-functional monomer in the copolymer.

It is stressed that large amounts of N-methylol functionality is needed in order to cure the low molecular weight copolymers to the point where they possess good properties. On the other hand, the more N-methylol functionality, the more undesirable prereaction during copolymerization and storage in the aqueous acidic medium of the electrocoating bath. On the other hand, if etherification is used to stabilize the N-methylol functional groups and prevent their prereaction, then these ether groups either hydrolyze in the aqueous medium to cause prereaction, or the hydrolysis-resistant ether groups prevent or reduce water dispersibility.

In our prior application, Ser. No. 20,668, filed Mar. 15, 1979, of which this application is a continuation-in-part, we used from 35% to 50% of isobutoxymethyl acrylamide or methacrylamide in order to provide enough N-methylol functionality in the copolymer to avoid the use of external curing agents, but we have now found that superior properties are obtainable when the N-methylol functionality is reduced somewhat and certain external curing agents are used in small amounts.

DISCLOSURE OF INVENTION

In this invention, a solution copolymer is formed to include from 3% to 35% of at least one monoethylenically unsaturated monomer having a basic amino group and preferably containing from 3 to 20 carbon atoms, from 20% to less than 35% of isobutoxymethyl acrylamide or methacrylamide, 0% to 15%, preferably from 1% to 10% of a monomer providing active hydrogen atoms coreactive with N-methylol functionality, and the balance of the copolymer is constituted by monoethylenically unsaturated nonreactive monomers. These copolymers are used in admixture with from 5%-30% of the weight of the copolymer of an aminoplast resin.

The term "nonreactive" denotes the absence of functional groups, other than the single polymerizable unsaturated group, which will react under the contemplated conditions of polymerization and cure. Normally, this means that no other functional group is present. Suitable nonreactive monomers are illustrated by styrene, vinyl toluene, $C_1$-$C_8$ alkyl esters of monoethylenic acids, vinyl acetate, acrylonitrile, and the like. In the preferred practice of this invention, styrene and/or vinyl toluene is combined with 2-ethylhexyl methacrylate in amounts providing from 20–45% of styrene and/or vinyl toluene to from 25–40% of 2-ethylhexyl methacrylate. The use of such a large proportion of 2-ethylhexyl methacrylate improves the hydrolytic stability of the bath and helps to allow the use of less than 35% isobutoxymethyl acrylamide while achieving outstanding corrosion resistance. It is surprising to be able to use such large amounts of long chain esters and ethers in a stable aqueous dispersion.

The amine-functional monomers which may be used are well known and are desirably amino alkyl derivatives of a monoethylenically unsaturated carboxylic acid or an amide thereof. Dimethyl aminoethyl methacrylate is quite suitable, but any monoethylenically unsaturated copolymerizable amine, be it primary, secondary or tertiary, may be used herein. The tertiary amines are preferred and are most available. Other suitable amine monomers are illustrated by dimethyl aminopropyl methacrylate, monomethyl aminoethyl methacrylate, aminoethyl methacrylate, and the corresponding acrylates, crotonates and the like. The amino amides are particularly preferred, as illustrated by dimethyl aminopropyl methacrylamide.

The proportion of the amine monomer in the copolymer is subject to considerable variation, but from 3% to 35%, preferably from 10% to 25%, based on the weight of the copolymer, illustrates usual practice.

While reactive monomers other than the isobutoxymethyl acrylamide or methacrylamide may be absent, up to 15% of the weight of the copolymer may be constituted by a monomer providing active hydrogen atoms which is coreactive with the N-methylol functionality in the copolymer. Among the reactive monomers which may be present in an amount of from 1% to 10%, are amides, such as acrylamide, and hydroxy monomers, such as hydroxy alkyl acrylates and methacrylates in which the alkyl group normally contains from 2-4 carbon atoms. It is especially preferred to employ as the reactive monomer, a monoethylenically unsaturated carboxylic acid, such as acrylic acid, crotonic acid, itaconic acid, or methacrylic acid. Fumaric acid or monoethyl fumarate will further illustrate the acids which may be used.

It is desired to stress the fact that the cure herein involves the removal of alcohol in a condensation reaction which must consume a large number of N-methylol groups. This condensation reaction is catalyzed by the presence of acid, but the acid groups used for solubilization are removed by the electrophoretic action which caused cationic electrodeposition. The presence of the carboxyl groups in the copolymer catalyzes this cure. At the same time, most of the acidity is eliminated by the cure because of the large amount of N-methylol functionality which is present to consume the relatively small proportion of carboxyl functionality.

The isobutoxy ether is essential to this invention. With ethers having less than four carbon atoms present in the isobutoxy ether, hydrolysis in the acidic electrocoating bath provides N-methylol groups and these react slowly to change the characteristics of the bath. The more N-methylol groups, the more the bath changes with time. On the other hand, other ether groups which resist hydrolysis because they contain more than four carbon atoms are not useful because these longer groups are hydrophobic and prevent satisfactory dispersion of the amine-functional copolymer with the aid of an acid. More particularly, more acid is needed and the bath pH falls below 5.0 which creates corrosive conditions. In the preferred practice of this invention, the bath pH is in the range of 6.0 to 7.0.

While the copolymer consists essentially of monoethlenically unsaturated materials, polyethylenically unsaturated copolymerizable materials may also be present so long as they do not prevent the achievement of a solvent-soluble, nongelled copolymer as taught in U.S. Pat. No. 4,085,020.

The copolymerization in organic solvent solution may be carried out in conventional fashion using a water miscible organic solvent, moderate heat, and a free radical-generating polymerization catalyst such as azobisisobutyronitrile, benzoyl peroxide or cumene hydroperoxide. While chain termination using agents such as alkyl mercaptans can be used, such agents are preferably absent since the amine monomer is itself an inhibitor of the desired copolymerization.

In preferred practice, the best copolymers are made by slowly adding the materials to be copolymerized to a heel of the solvent containing a stoichiometric deficiency of the solubilizing acid. This technique of providing the amine copolymer in partial salt form was developed by ourselves, see application Ser. No. 14,101 filed Feb. 22, 1979. This incremental addition process is used in the example to show preferred practice, but it is not essential of this invention.

The preferred acids for solubilizing the amine copolymers are organic acids, such as acetic acid, glycollic acid, and, most preferably, dimethylol propionic acid. However, inorganic acids which do not damage the deposited film, like phosphoric acid, are also useful. Acids which vaporize or decompose are particularly contemplated since it is usually best not to have the solubilizing acid present in the final cured coating. Neutralization is desirably less than 90%, preferably from 25% to 70%, including the acid which forms part of the copolymer.

An aminoplast resin in an amount of from 5-30% of the weight of the copolymer, preferably from 10-20% is used for cure. The preferred aminoplast resins are benzoguanamine-formaldehyde and bisphenol-formaldehyde as described in application Ser. No. 063,715 filed Aug. 6, 1979, in the name of Edward J. Murphy.

BEST MODE FOR CARRYING OUT THE INVENTION

The invention is illustrated in the following example:

Example

| Grams | Component |
|---|---|
| 321 | 2-butoxy ethanol |
| 40 | Dimethylol propionic acid (to neutralize amino monomer to about 50%) |

The above are charged to a reactor and heated to 95° C. to form a heel of solution in which the polymerization is carried out.

| 145 | Isobutoxymethyl acrylamide |
|---|---|
| 218 | Styrene |
| 191 | 2-ethyl hexyl methacylate |
| 105 | Dimethyl aminopropyl methacrylamide |
| 12 | Azobisisobutyronitrile |

The above are premixed and added to the heel of acid-containing solvent slowly over a 3 hour period while maintaining 90° C. When this addition is finished, most of the polymerization has been completed. To insure completion of reaction, 2 grams of azobisisobutyronitrile is added and the temperature is maintained at 90° C. for one hour, and this procedure is repeated one more time, at which point the conversion of monomer to polymer is complete. 15% by weight of benzoguamine-formaldehyde resin (XM 1123 from American Cyanamide) is added and then enough deionized water is added with rapid agitation to provide an aqueous bath which is a milky dispersion having a solids content of about 28% and having a pH of about 6.5.

INDUSTRIAL APPLICATION

Electrodeposition at the cathode after dilution with deionized water to 10% solids content proceed well at 75 volts. The coated cathode is removed from the bath and cured by baking in an oven having a temperature of 350° F. or higher, the lower the baking temperature, the longer the time needed for cure. 400° F. to 450° F. for 30 to 15 minutes is a typical curing schedule. In this example coated panels were baked for 20 minutes at 400° F. and had excellent methyl ethyl ketone resistance and corrosion resistance. The bath was stable and retained its desirable characteristics on prolonged use.

We claim:

1. Cationic amine-functional copolymer mixtures in which said copolymer is a solution copolymer of monoethylenically unsaturated monomers consisting essentially of from 3% to 35% of monomer having a basic amino group, from 20% to less than 35% of isobutoxymethyl acrylamide or methacrylamide, from 0% to 15% of monomer providing active hydrogen atoms coreactive with N-methylol functionality, and the balance of the copolymer consisting essentially of nonreactive monomers, said proportions being based on the weight of the copolymer, and the amine groups in the copolymer being neutralized in an amount up to about 90% by a solubilizing acid to render said copolymer cationic and dispersible in water with the aid of a water miscible organic solvent, and from 5% to 30%, based on the weight of the copolymer, of an aminoplast resin or bisphenol-formaldehyde resin.

2. Cationic amine-functional copolymer mixtures as recited in claim 1 in which said monomer having a basic amino group is a tertiary amine.

3. Cationic amine-functional copolymer mixture as recited in claim 2 in which said monomer is a dimethyl amino alkyl derivative of a monoethylenically unsaturated carboxylic acid or an amide thereof.

4. Cationic amine-functional copolymer mixtures as recited in claim 3 in which said copolymer is neutralized in an amount of from 25% to 75% and said amine monomer is dimethyl aminopropyl methacrylamide.

5. Cationic amine-functional copolymer mixtures as recited in claim 1 in which said copolymer includes from 1% to 10% of a monoethylenically unsaturated carboxylic acid.

6. Cationic amine-functional copolymer mixtures as recited in claim 1 in which isobutoxymethyl acrylamide is used.

7. Cationic amine-functional copolymer mixtures as recited in claim 1 in which the nonreactive monomers consist essentially of styrene and/or vinyl toluene in admixture with from 15% to 45% of 2-ethylhexyl methacrylate.

8. Cationic amine-functional copolymer mixtures as recited in claim 7 in which said amine monomer is used in an amount of from 10% to 25% and said styrene and/or vinyl toluene is used in an amount of from 20% to 45%.

9. Cationic amine-functional copolymer mixtures as recited in claim 1 in which said copolymer is present in stable dispersion in water to provide a bath having a pH in excess of pH 5.0.

10. Cationic amine-functional copolymer mixtures as recited in claim 1 in which said water dispersion has a pH in the range of pH 6.0–7.0.

11. Cationic amine-functional copolymer mixtures as recited in claim 1 in which said aminoplast resin is a benzoguanamine-formaldehyde condensate.

12. Cationic amine-functional copolymer mixtures as recited in claim 11 said aminoplast resin is present in an amount of from 10% to 20% of the weight of the copolymer.

* * * * *